(12) United States Patent
Datar et al.

(10) Patent No.: US 10,198,744 B2
(45) Date of Patent: Feb. 5, 2019

(54) USER-TARGETED ADVERTISING

(75) Inventors: Mayur Datar, Santa Clara, CA (US); Jason C. Miller, Mountain View, CA (US); Michael Hochberg, Los Altos, CA (US); Bahman Rabii, San Francisco, CA (US); Megan Nance, Sunnyvale, CA (US); Julie Tung, Mountain View, CA (US); Jeremiah Harmsen, Mountain View, CA (US); Tomasz J. Tunguz-Zawislak, San Francisco, CA (US); Andres S. Perez-Bergquist, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 13/617,912

(22) Filed: Sep. 14, 2012

(65) Prior Publication Data

US 2013/0013646 A1 Jan. 10, 2013

Related U.S. Application Data

(63) Continuation of application No. 12/025,239, filed on Feb. 4, 2008.

(51) Int. Cl.
*G06Q 30/02* (2012.01)
*G06F 17/30* (2006.01)

(52) U.S. Cl.
CPC ... *G06Q 30/0251* (2013.01); *G06F 17/30867* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,933,811 A | 8/1999 | Angles et al. | |

(Continued)

FOREIGN PATENT DOCUMENTS

| | | |
|---|---|---|
| JP | 2000-56721 | 2/2000 |
| JP | 2001-243241 | 9/2001 |

(Continued)

OTHER PUBLICATIONS

Office Action issued in U.S. Appl. No. 12/025,239 dated May 14, 2010, 17 pages.
Office Action issued in U.S. Appl. No. 12/025,239 dated Oct. 29, 2010, 13 pages.
Office Action issued in U.S. Appl. No. 12/025,239 dated May 27, 2011, 17 pages.
Office Action issued in U.S. Appl. No. 12/025,239 dated Mar. 13, 2012, 13 pages.

(Continued)

*Primary Examiner* — Ashish Thomas
*Assistant Examiner* — Mellissa M. Ohba
(74) *Attorney, Agent, or Firm* — Fish & Richardson P.C.

(57) ABSTRACT

Structured data sets including one or more attributes are identified, each structured data set associated with, for example, a particular user. Values corresponding the at least one of the one or more attributes in each structured data set are identified. A condition established by a content provider, for instance, an advertiser, is compared to the identified values to determine if the condition is satisfied. When the condition is satisfied, one or more content items are identified to the users associated with the structured data sets containing identified values satisfying the condition.

26 Claims, 5 Drawing Sheets

(56) References Cited

U.S. PATENT DOCUMENTS

| | | | |
|---|---|---|---|
| 5,948,061 | A | 9/1999 | Merriman |
| 5,987,440 | A | 11/1999 | O'Neil et al. |
| 5,999,975 | A | 12/1999 | Kittaka et al. |
| 6,026,368 | A | 2/2000 | Brown et al. |
| 6,044,376 | A | 3/2000 | Kurtzman, II |
| 6,078,914 | A | 6/2000 | Redfern |
| 6,144,944 | A | 11/2000 | Kurtzman, II et al. |
| 6,167,382 | A | 12/2000 | Sparks et al. |
| 6,269,361 | B1 | 7/2001 | Davis et al. |
| 6,401,075 | B1 | 6/2002 | Mason et al. |
| 6,446,045 | B1 | 9/2002 | Stone et al. |
| 6,477,575 | B1 | 11/2002 | Koeppel et al. |
| 6,629,097 | B1 * | 9/2003 | Keith ............... G06F 17/30598 |
| 6,829,587 | B2 | 12/2004 | Stone et al. |
| 6,985,882 | B1 | 1/2006 | Del Sesto |
| 7,136,875 | B2 | 1/2006 | Anderson et al. |
| 7,039,599 | B2 | 5/2006 | Merriman |
| 7,188,137 | B2 | 3/2007 | Inoue et al. |
| 7,194,424 | B2 | 3/2007 | Greer et al. |
| 7,240,025 | B2 | 7/2007 | Stone et al. |
| 7,249,059 | B2 | 7/2007 | Dean et al. |
| 7,904,337 | B2 | 3/2011 | Morsa |
| 8,224,850 | B2 * | 7/2012 | Kelley ................ H04W 4/02 707/623 |
| 2001/0011226 | A1 | 8/2001 | Greer et al. |
| 2003/0028451 | A1 | 2/2003 | Ananian |
| 2004/0193488 | A1 | 9/2004 | Khoo et al. |
| 2004/0243466 | A1 | 12/2004 | Trzybinski et al. |
| 2006/0026067 | A1 | 2/2006 | Nicholas et al. |
| 2006/0242554 | A1 | 10/2006 | Gerace et al. |
| 2006/0271438 | A1 * | 11/2006 | Shotland et al. ............... 705/14 |
| 2006/0271526 | A1 | 11/2006 | Charnock et al. |
| 2006/0282328 | A1 | 12/2006 | Gerace et al. |
| 2007/0027754 | A1 | 2/2007 | Collins et al. |
| 2007/0067297 | A1 | 3/2007 | Kublickis |
| 2007/0100862 | A1 * | 5/2007 | Reddy ............... G06F 17/30551 |
| 2007/0121843 | A1 | 5/2007 | Atazky et al. |
| 2007/0208751 | A1 * | 9/2007 | Cowan .................. G06Q 30/02 |
| 2008/0091796 | A1 | 4/2008 | Story et al. |
| 2008/0098420 | A1 | 4/2008 | Khivesara et al. |
| 2008/0104026 | A1 * | 5/2008 | Koran ............................ 707/3 |
| 2008/0109306 | A1 * | 5/2008 | Maigret et al. ................ 705/14 |
| 2008/0189169 | A1 | 8/2008 | Turpin et al. |
| 2008/0281711 | A1 | 11/2008 | Bridges et al. |
| 2008/0288310 | A1 | 11/2008 | Aaltonen et al. |
| 2008/0300974 | A1 * | 12/2008 | Bhandari et al. ............... 705/14 |
| 2009/0012991 | A1 * | 1/2009 | Johnson ................ G06Q 30/02 |
| 2009/0063284 | A1 | 3/2009 | Turpin et al. |
| 2009/0112701 | A1 | 4/2009 | Turpin et al. |
| 2009/0119167 | A1 * | 5/2009 | Kendall et al. ................ 705/14 |
| 2009/0150930 | A1 | 6/2009 | Sherwin et al. |
| 2009/0198711 | A1 * | 8/2009 | Datar et al. .................... 707/100 |
| 2011/0023060 | A1 | 1/2011 | Dmitriev et al. |

FOREIGN PATENT DOCUMENTS

| | | |
|---|---|---|
| JP | 2001-266257 | 9/2001 |
| KR | 10-2001-0085212 A | 9/2001 |
| KR | 10-2001-0109038 A | 12/2001 |
| KR | 10-2002-0075117 A | 10/2002 |
| WO | WO 97/21183 | 6/1997 |
| WO | 01/71587 | 9/2001 |
| WO | 2007/052285 | 5/2007 |

OTHER PUBLICATIONS

Office Action issued in U.S. Appl. No. 12/025,239 dated Dec. 20, 2012, 19 pages.
European Search Report issued in EP 09707479.3 dated Sep. 14, 2012, 3 pages.
European Office Action issued in EP 09707479.3 dated Oct. 5, 2012, 5 pages.
Office Action issued in AU 2009212496 dated Feb. 1, 2013, 6 pages.
Canadian Office Action in Canadian Application No. 2,714,057, dated Mar. 11, 2014, 2 pages.
Office action dated Aug. 13, 2013 in corresponding Japanese Application No. 2010-545951, 6 pgs.
Office Action issued in U.S. Appl. No. 12/025,239 dated Mar. 27, 2014, 32 pages.
Office Action issued in Japanese Application No. 2010-545951 dated Apr. 21, 2014, 4 pages (with English translation).
Office Action issued in U.S. Appl. No. 12/025,239 dated Feb. 12, 2015, 37 pages.
Office Action issued in Canadian Application No. 2,714,057 dated Apr. 17, 2015.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
U.S. Appl. No. 95/001,073, filed Jul. 30, 2008, Stone et al.
U.S. Appl. No. 95/001,061, filed Jul. 21, 2008, Stone et al.
U.S. Appl. No. 95/001,069, filed Jul. 21, 2008, Dean et al.
U.S. Appl. No. 95/001/068, filed Jul. 21, 2008, Stone et al.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Pat. No. 7,240,025 B2, Control No. 95/001,073.
Request for Reexamination of U.S. Pat. No. 6,446,045 B1, Control No. 95/001,061.
Request for Reexamination of U.S. Pat. No. 7,249,059 B2, Control No. 95/001,069.
Request for Reexamination of U.S. Pat. No. 6,829,587 B2, Control No. 95/001,068.
PCT Application No. PCT/US2009/032976, International Search Report dated Sep. 18, 2009, 11 pages.

* cited by examiner

USER-TARGETED ADVERTISING

CROSS-REFERENCE TO RELATED APPLICATION

Pursuant to 35 U.S.C. § 120, this application is a continuation of and claims priority to U.S. application Ser. No. 12/025,239, filed Feb. 4, 2008.

BACKGROUND

The subject matter of this application is generally related to information presentation.

Advertising using traditional media, such as television, radio, newspapers and magazines, is well known. Unfortunately, even when armed with demographic studies and entirely reasonable assumptions about the typical audience of various media outlets, advertisers recognize that a non-trivial portion of their ad budget is simply wasted. Moreover, it is very difficult to identify and eliminate such waste. Recently, advertising over more interactive media has become popular. For example, as the number of people using the Internet has exploded, advertisers have come to appreciate media and services offered over the Internet as a potentially powerful way to advertise.

Web site-based advertisements ("ads" also referred to as "Web ads") are some times presented to their advertising audience in the form of "banner ads"—i.e., a rectangular box that includes graphic components. When a member of the advertising audience (hereinafter referred to as a "viewer" or "user" without loss of generality) selects one of these banner ads by clicking on it, embedded hypertext links typically direct the viewer to the advertiser's Web site. This process, wherein the viewer selects an ad, is commonly referred to as a "click-through" ("click-through" is intended to cover any user selection). The ratio of the number of click-throughs to the number of impressions of the ad (i.e., the number of times an ad is displayed) is commonly referred to as the "click-through rate" of the ad.

Online social networks have become popular for professional and/or social networking, and are thus popular locations for placing advertisements. Some online social networks provide content items that may be of interest to users, including identification of other users and/or groups that may of interest to a user. Advertisement placement on social networking sites is challenging because such sites have users with many different interests. Accordingly, many advertisements, e.g., advertisements directed to particular products, may not be of interest to many users of an online social network.

SUMMARY

Systems, methods, and computer program products described in this specification establish a structured data set for each of a number of users. Content providers establish conditions that are compared to values within the structured data sets to identify users that satisfy the conditions. Content providers can display content only to those users whose structured data sets satisfy the conditions. This may be particularly advantageous where a large number of characteristics are known about users, such as users that maintain profiles that are stored and accessible by the system and processes described herein. This can include, for instance, users that are members of online social networks. Additionally, content providers can identify the number of users that satisfy conditions and use that knowledge to further modify the conditions in real-time (i.e., immediately after creating the initial condition) to broaden or restrict the number of users that may receive content. Using an iterative process allows content providers to target a specific audience. This iterative and real-time process may be advantageous, for instance, during the creation of an advertising campaign where content providers can refine their conditions repeatedly in minutes to identify an appropriate subset of users to receive content.

In general, one aspect of the subject matter described in this specification can be embodied in methods that include the actions of identifying a plurality of structured data sets, each structured data set associated with a user and including one or more attributes, identifying values corresponding to at least one of the one or more attributes in each structured data set, comparing a condition established by a content provider to one or more of the identified values, and determining a number of structured data sets having the one or more of the identified values that satisfy the condition established by the content provider.

According to a feature, the method includes receiving a revised condition from the content provider. According to another feature, the method can include comparing the revised condition to one or more of the identified values. The method can also include determining a number of structured data sets having the one or more of the identified values that satisfy the revised condition established by the content provider. One or more content items may also be displayed to users associated with the structured data sets having the one or more of the identified values that satisfy the condition established by the content provider.

According to yet another feature, the method can include identifying a click through rate associated with displayed one or more content items.

According to another features, the one or more attributes represent characteristics of the user associated with each structured data set. The one or more attributes can include age, gender, number of friends, interests, zip code, or length of time since previous login.

According to still additional features, the method can include receiving the condition from the content provider, where the condition identifies one or more required values associated with at least one of the one or more attributes. The one or more required values can be compared with the identified values. In another feature, the method can determine when the identified values satisfy the condition. According to yet another feature, the one or more attributes include one or more public attributes and/or one or more private attributes. The one or more public attributes can be displayed to the content provider.

Other embodiments of this aspect include corresponding systems, apparatus, and computer program products.

One or more of the following advantages may be achieved. Content providers such as advertisers can target a certain market segment for marketing. Rather than displaying content to an entire user population content providers can restrict content to a certain subset of users that the content providers can identify based on their attributes, i.e., characteristics. As an alternate to restricting ads to a subset of users, content providers may pay more for ads shown to a subset of users.

DETAILED DESCRIPTION

Figure 1:
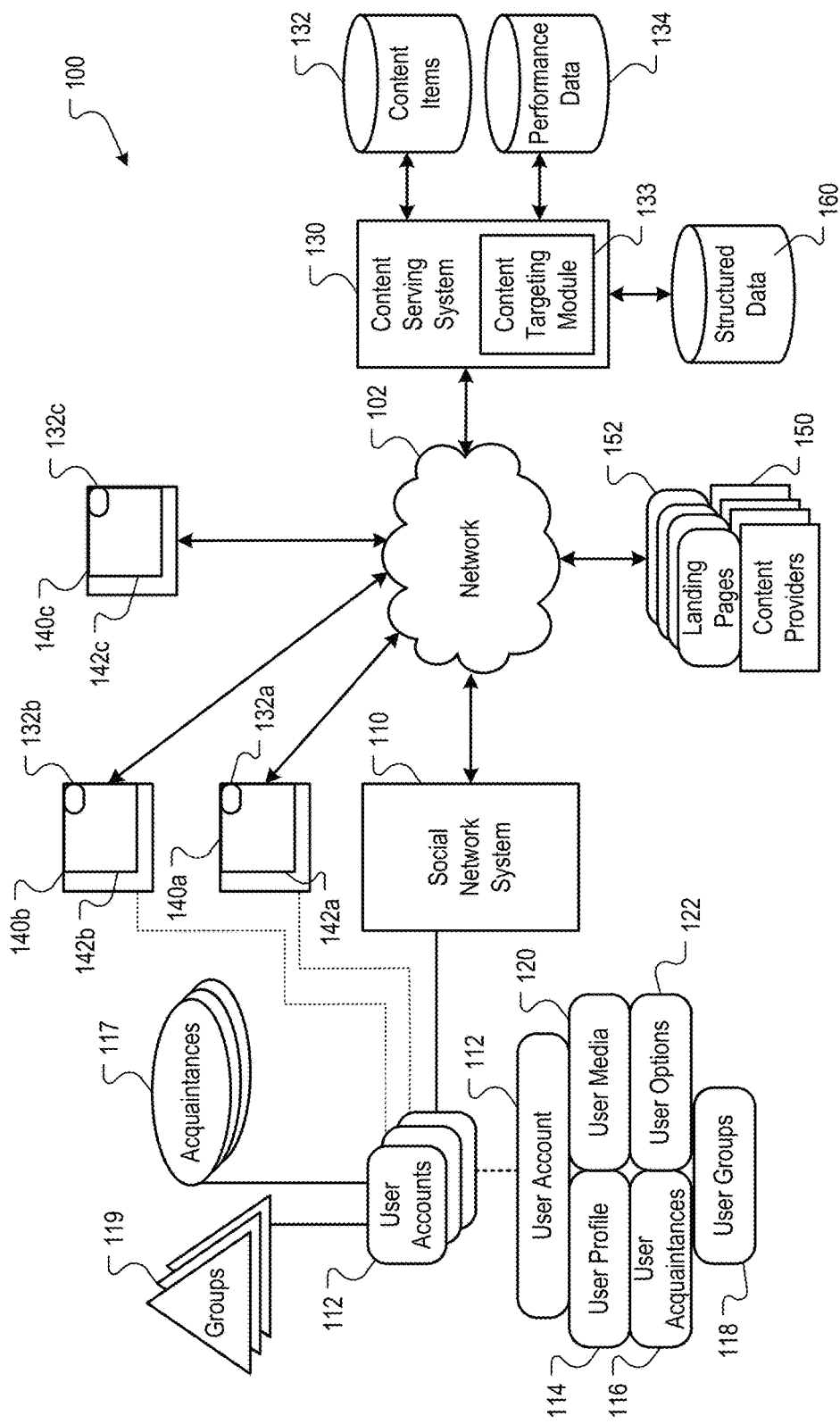
FIG. 1 is a block diagram of an example system for identifying content items based on structured data sets.

FIG. 1 is a block diagram of an example system 100 for identifying content items, such as advertisements, based on structured data sets. In some implementations, each structured data set corresponds to a particular user. Alternatively, a structured data set can correspond to all members of a class of users. Structured data sets include structured data that, in some implementations, includes a number of attribute-value pairs. Attributes may be common to many users and identify characteristics of users (e.g., age, gender, weight, etc.), whereas the value corresponding to each attribute in each structured data set defines a characteristic of that user. For instance, a structured data set for an individual may include the following attribute-values pairs:

Age: 35 yrs
Gender: Male
Number of Friends: 72
Interests: Cars, Reading
Zip code: 30067
Days Since Last Login: 10 where 'Age', 'Gender', 'Number of Friends', 'Interests', 'Zip code', and 'Days Since Last Login' are attributes, and '35 yrs', 'Male', '72', 'Cars', 'Reading', '30067', and '10' are values. The attributes and values associated with each are used to determine whether each user satisfies conditions established by a content provider, as explained in greater detail below.

In some implementations, structured data may be identified from data collected and/or stored by a social network system 110 that can, for example, host numerous user accounts 112. An example social network system can include Orkut, hosted by Google, Inc., of Mountain View, Calif. Other social networks can, for example, include school alumni websites, an internal company web site, dating networks, or the like. Each user account 112 can, for example, include user profile data 114, user acquaintances data 116, user groups data 118, user media data 120, and user options data 122. Other user data can also be included in the user accounts 112. The data in each user account can be used to populate the structured data 160 for each user, and more particularly, the attribute-value pairs. Structure data 160 may be stored internal or external (as shown in FIG. 1) to the social network system 110 or may be stored at a location accessible anywhere on a network 102, such as the Internet. In some cases, where the social network is different from the content server, a copy of the structured data may be provided by the social network to the content server and maintained separately and updated regularly.

The user profile data 114 can, for example, include general demographic data about a user, such as age, sex, home location, interests, etc. In some implementations, the user profile data 114 can also include professional information, e.g., occupation, educational background, etc., and other data, such as contact information. In some implementations, the user profile data 114 can include open profile data, e.g., free-form text that may be typed by the user into fields for various subjects, e.g., "Job Description," "Favorite Foods," "Hobbies," etc., and constrained profile data, e.g., binary profile data selected by check boxes, radio buttons, etc., or predefined selectable profile data, e.g., income ranges, zip codes, etc. In some implementations, some or all or the user profile data 114 can be classified as public or private profile data, e.g., data that can be shared publicly or data that can be selectively or otherwise not shared. According to some implementations, profile data 114 not classified as private data can, for example, be classified as public data, e.g., data that can be viewed by any user accessing the social network system 110.

The user acquaintances data 116 can, for example, define user acquaintances 117 associated with a user account 112. In some implementations, user acquaintances 117 can include, for example, users associated with other user accounts 112 that are classified as "friends," e.g., user accounts 112 referenced in a "friends" or "buddies" list. Other acquaintances 117 can also be defined, e.g., professional acquaintances, client acquaintances, family acquaintances, etc. In some implementations, the user acquaintance data 116 for each user account 112 can, for example, be specified by users associated with each user account 112, and thus can be unique for each user account 112.

The user groups data 118 can, for example, define user groups 119 to which a user account 112 is associated. In an implementation, user groups 119 can, for example, define an interest or topic, e.g., "Wine," "Open Source Chess Programming," "Travel Hints and Tips," etc. In some implementations, the user groups 119 can, for example, be categorized, e.g., a first set of user groups 119 can belong to an "Activities" category, a second set of user groups 119 can belong to an "Alumni & Schools" category, etc.

The user media data 120 can, for example, include one or more content items, such as user documents, e.g., web pages. A document can, for example, include a file, a combination of files, one or more files with embedded links to other files, etc. The files can be of any type, such as text, audio, image, video, hyper-text mark-up language documents, etc. In the context of the Internet, a common content item is a Web page. Other content items can also be defined by the user media data 120.

The user options data 122 can, for example, include data specifying user options, such as e-mail settings, acquaintance notification settings, chat settings, password and security settings, etc. Other option data can also be included in the user options data 122.

In some implementations, the content serving system 130 can directly, or indirectly, enter, maintain, identify, and track content items 132. The content items 132 can, for example, include a web page or other content document, or text, graphics, video, audio, mixed media, etc. In some implementations, the content items 132 are advertisements. The advertisements can, for example, be in the form of graphical ads, such as banner ads, text only ads, image ads, audio ads, video ads, ads combining one of more of any of such components, etc. The advertisements can also include embedded information, such as links, meta-information, and/or machine executable instructions.

In some implementations, user devices 140a, 140b and 140c can communicate with the social network system 110 over the network 102, such as the Internet. The user devices 140 can be any device capable of receiving the user media data 120, such as personal computers, mobile devices, cell phones, personal digital assistants (PDAs), television systems, etc. The user devices 140 can be associated with user accounts 112, e.g., the users of user devices 140a and 140b can be logged-in members of the social network system 110, having corresponding user accounts 112a and 112b. Additionally, the user devices 140 may not be associated with a user account 112, e.g., the user of the user device 142c may not be a member of the social network system 110 or may be a member of the social network system 110 that has not logged in.

In some implementations, upon a user device 140 communicating a request for media data 120 of a user account 112, or a request for some other social network media data to the social network system 110, the social network system 110 can, for example, provide the user media data 120 or the other requested media data to user device 140. In some implementations, the user media data 120 or other requested media data can include an embedded request code, such as one or more Javascript code snippets. In other implementations, the social network system 110 can insert the embedded request code into the user media data 120 or the other requested media data when served to a user device 140.

The user device 140 can render the requested data, e.g., a user web page, or some other social network 110 page, in a presentation environment 142, e.g., in a web browser application. Upon rendering the requested data, the user device 140 executes the request code, which causes the user device 140 to issue a content request, e.g., an advertisement request, to the content serving system 130. In response, the content serving system 130 can provide one or more content items 132 to the user device 140. For example, the content items 132a, 132b and 132c can be provided to the user devices 140a, 140b and 140c, respectively. In some implementations, the content items 132a, 132b and 132c are presented in the presentation environments 142a, 142b and 142c, respectively.

Rather than displaying content to an entire user population content providers 150 can restrict content to a certain subset of users that the content providers 150 can identify based on their attributes, i.e., user characteristics. According to some implementations, the content serving system 130 includes a content targeting module 133 that can identify users that should receive content items 132 based on structured data sets 160 for those users, such as users associated with the user accounts 112.

The content targeting module 133 receives conditions from content providers 150 and compares those conditions to values within each user's structured data set to identify those users whose attributes and values satisfy the content provider conditions. As an example, a content provider 150 may establish the condition that users receive content, or a particular type of content, only when those users' structured data sets meet the following attribute-value conditions: "Age: between 25 and 35", "Zip code: 95051", and "Number of Friends>10." This permits the content provider 150 to target certain subsets of users.

Although displayed as part of the content serving system 130 in the implementation shown in FIG. 1, the content targeting module 133 can be integrated into the social network system 110. In other implementations, the content targeting module 133 can be a separate system in data communication with the social network system 110 and/or the content server system 130. The content targeting module 133 can be implemented in software and executed on a processing device, such as the computer system 600 of FIG. 6. Example software implementations include C, C++, Java, or any other high-level programming language that may be utilized to produce source code that can be compiled into executable instructions. Other software implementations can also be used, such as applets, or interpreted implementations, such as scripts, etc. Alternatively, the content targeting module 133 can be implemented in hardware or a combination of hardware and software.

Content providers 150 can use the identified number of users to further modify the conditions to broaden or restrict the number of users that satisfy the conditions. Using an iterative process allows content providers 150 to target a specific audience. This may be particularly advantageous where a large number of characteristics are known about users, such as users that maintain profiles and data stored within a social networking system 110.

The iterative process of modifying conditions to identify a desired subset of users can occur in real-time based on current structured data and performance information. For instance, a content provider such as an advertiser may adjust the conditions using a graphical user interface (GUI) at the content targeting module 133. An advertiser can repeatedly refine conditions in minutes to identify an appropriate subset of users to receive content. Each time a condition is established it is compared by the content targeting module 133 against currently stored structured data and performance data to provide the content provider with real-time results. Content providers can view in real time what how many users will receive impressions, the anticipated click through rate of those impressions, and the like, for each content-provider entered condition.

According to some implementations, content providers may be charged or be willing to pay a higher content placement fee (e.g., advertising fee) for placement of content directed to a specific set of users that satisfy the content provider's conditions. Thus, once a content provider has established conditions that the content provider feels captures the correct target audience, the content provider may be charged a premium for content placement for those target users. Although the advertiser may pay more for content placement in front of the target group, the advertiser may be willing to pay a greater amount for placement of content, e.g., advertisements, that are provided to a group of users that are likely to provide the advertiser with a high return on the advertiser's investment.

According to an implementation, conditions may be compared by the content targeting module 133 to structured data sets during periods of low traffic or at other times regardless of whether a content provider has requested identification of the users that may satisfy the conditions. When this occurs, each user's structured data set may be tagged by the content targeting module 133 as satisfying (or failing to satisfy) one or more conditions and/or combination of conditions. This optimization reduces the need for the content targeting module 133 to constantly compare all values within structured data sets to conditions in real-time or in near-real time.

According to some implementations, the content providers 150 can, for example, include web sites having "landing pages" 152 that a user is directed to when the user clicks (e.g., interacts with) an advertisement 132 presented on page provided from the social networking system 110. For example, the content providers 150 can provide content items 132 in the form of "creatives," which are advertisements that may include text, graphics and/or audio associated with the advertised service or product, and a link to a web site.

In some implementations, the content serving system 130 can monitor and/or evaluate performance data 134 related to the content items 132. For example, the performance of each advertisement 132 can be evaluated based on a performance metric, such as a click-through rate, a conversion rate, or some other performance metric. A click-through can occur, for example, when a user of a user device, e.g., user device 140a, selects or "clicks" on an advertisement, e.g. the advertisement 132a. The click-through rate can be a performance metric that is obtained by dividing the number of users that clicked on the advertisement or a link associated with the advertisement by the number of times the advertisement was delivered. For example, if advertisement is delivered 100 times, and three persons clicked on the advertisement, then the click-through rate for that advertisement is 3%.

A "conversion" occurs when a user, for example, consummates a transaction related to a previously served advertisement. What constitutes a conversion may vary from case to case and can be determined in a variety of ways. For example, a conversion may occur when a user of the user device 140a clicks on an advertisement 132a, is referred to the advertiser's Web page, such as one of the landing pages 152, and consummates a purchase before leaving that Web page. Other conversion types can also be used. A conversion rate can, for example, be defined as the ratio of the number of conversions to the number of impressions of the advertisement (i.e., the number of times an advertisement is rendered) or the ratio of the number of conversions to the number of selections. Other types of conversion rates can also be used.

Other performance metrics can also be used. The performance metrics can, for example, be revenue related or non-revenue related. In some implementations, the performance metrics can be parsed according to time, e.g., the performance of a particular content item 132 may be determined to be very high on weekends, moderate on weekday evenings, but very low on weekday mornings and afternoons, for example. Performance data can be provided to the content providers 150 to assist the content provider in delivering, modifying, and determining content, such as advertisements, that is delivered to users. Performance data can also assist the content providers 150 in modifying the conditions that identify users that receive content.

Figure 2:
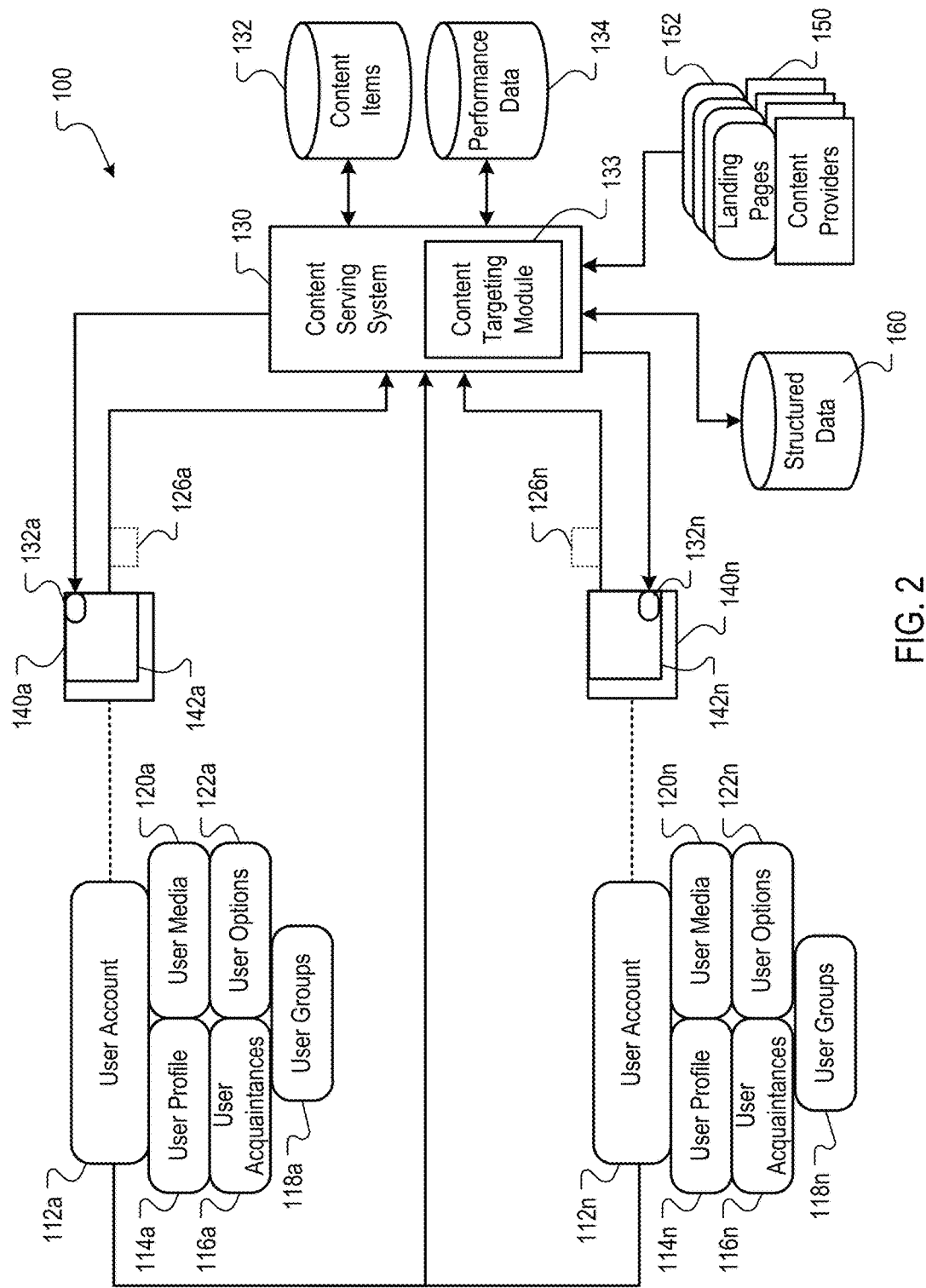
FIG. 2 is a more detailed block diagram of the example system for identifying content items based on structured data sets.

FIG. 2 is a more detailed block diagram of the example system 100 for identifying content items based on structure data sets. In the example system 100 of FIG. 2, the content targeting module 133 can utilize attribute-value pairs from structured data sets to determine those users that satisfy conditions established by one or more content providers 150.

In some implementations, attributes and their corresponding values are extracted from user profile data 114a-114n, user media data 120a-120n, user acquaintances data 116a-116n, user groups data 118a-118n, and user options data 122a-122n of user accounts 112a-112n. Attributes can include characteristics such as age, gender, zip code, and the like. Attributes can also include traits such as personality, values, attitudes, interests, lifestyles, etc. of users associated with the user accounts 112a-112n. Other types of attributes are possible.

According to some implementations, information provided by users in free-form text fields may be extracted by other system components, such as a natural language processor (not illustrated), to identify attributes and/or values. For instance, a user may identify their favorite hobbies by filling out a text field under the caption "Hobbies" by typing the sentence "I really enjoy hiking, especially long hikes when you can camp out for a few days. Indoor activities don't interest me at all, and I really don't like boring outdoor activities like gardening." A natural language processor can identify the attribute as "Hobbies" and values as "Hiking". As can be seen from the previous example, data associated with a user may identify things a user is disinterested in. Attribute value pairs can therefore include this information as well. Thus, in the above example, the attribute "Hobbies" may include a value "Gardening" that is modified or also paired with a negative indicator to indicate that the user is disinterested in a particular subject. A content provider 150 can establish a condition, e.g., that identifies users that fall within certain specifications, including disinterest in a particular subject.

In some implementations, an example process flow for identifying structured data sets begins when the content targeting module 133 receives the user profile data 114a-114n, user media data 120a-120n, user acquaintances data 116a-116n, user groups data 118a-118n, and user options data 122a-122n of user accounts 112a-112. The content serving system 130 and/or content targeting module 133 can, for example, be configured to extract attribute-value pairs from the received data. According to some implementations, the content targeting module 133 can utilize another component, such as a natural language processor or the like, to extract attribute-value pairs.

In some implementations, data 114, 116, 118, 120, 122 associated with a particular user account, e.g. user account 112a can, for example, be provided to the content serving system 130 by a user device 140 associated with the particular user account 112, e.g., the user device 140a upon which a logged in session for the particular user account 112a has been established. For example, if the user device 140a renders a web page from the social network system 110 that includes a content item request instruction, a corresponding content item request 126a that includes the user profile data 114a-114n, user media data 120a-120n, user acquaintances data 116a-116n, user groups data 118a-118n, and/or user options data 122a-122n can be provided to the content serving system 130.

Other schemes can also be used to provide the structured data 160 to the content server system 130. For example, the content serving system 130 may partner with the social network system 110 to receive user account 112 identifiers in corresponding content requests 126a-126n. In response to receiving the user account 112 identifiers, the content serving system 130 can transmit the user account 112 identifiers to the social network system 110 in a request for corresponding structured data 160. The social network system 110 can, in response, provide the corresponding structured data 160 to the content serving system 130. As mentioned earlier, in some implementations the social network system 110 periodically provides an updated copy of the structured data sets to the content serving system 130.

According to some implementations, the content serving system 130 and/or content targeting module 133 receives one or more conditions from the content providers 150 and compares the conditions to structured data corresponding to each user (also referred to as a 'structured data set'). The content targeting module 133 identifies the structured data sets, and thus users, that satisfy the content provider conditions. The content targeting module 133 can identify the users and/or number of users to the content provider 150, which can then optionally revise the conditions to target a broader or narrower group of users. The subset of users that satisfy the conditions may be provided to content providers in real time. When conditions are revised the content targeting module 133 re-compares the structured data sets with the revised conditions to identify users that satisfy the revised conditions. The content serving system 130 can then serve content provided from the content providers 150 to users that satisfy the conditions.

According to some implementations, structured data 160 can be provided to advertisers, e.g., the content providers 150. According to some implementations, only a portion of the structure data may be provided to the content providers 150. Therefore, each attribute-value pair may be identified as a public or private, and the content providers 150 may only receive public attribute-value pairs. According to other implementations, the content providers may be provided only with some or all attributes, and no values. Alternatively, the content providers may be provided only with some or all values, and no attributes.

Providing this information to the content providers 150 can, for example, facilitate the targeting of content items 132, e.g., advertisements, to social networking sites that have users having many different interests. For example, the structured data 160 for the social network system 110 may identify a set of highly relevant marketing verticals for which many of the users of the social network system 110 may have a strong interest. Accordingly, one or more content providers 150 can target advertisements related to the verticals to users of the social network system 110.

In some implementations, the content targeting module 133 can process the user accounts 112*a*-112*n* periodically, e.g., monthly, to revise the structured data 160. Other processing triggers, e.g., changes in the user account 112 corpus, can also be used. In some implementations, the content targeting module 133 can process the user accounts 112*a*-112*n* in an offline batch process. The processing results can, for example, be stored and accessed during the serving of content. In other implementations, the content targeting module 133 can process the user accounts 112*a*-112*n* in an online process, e.g., in response to a user device 140 submitting a content request to the social network system 110.

Figure 3:
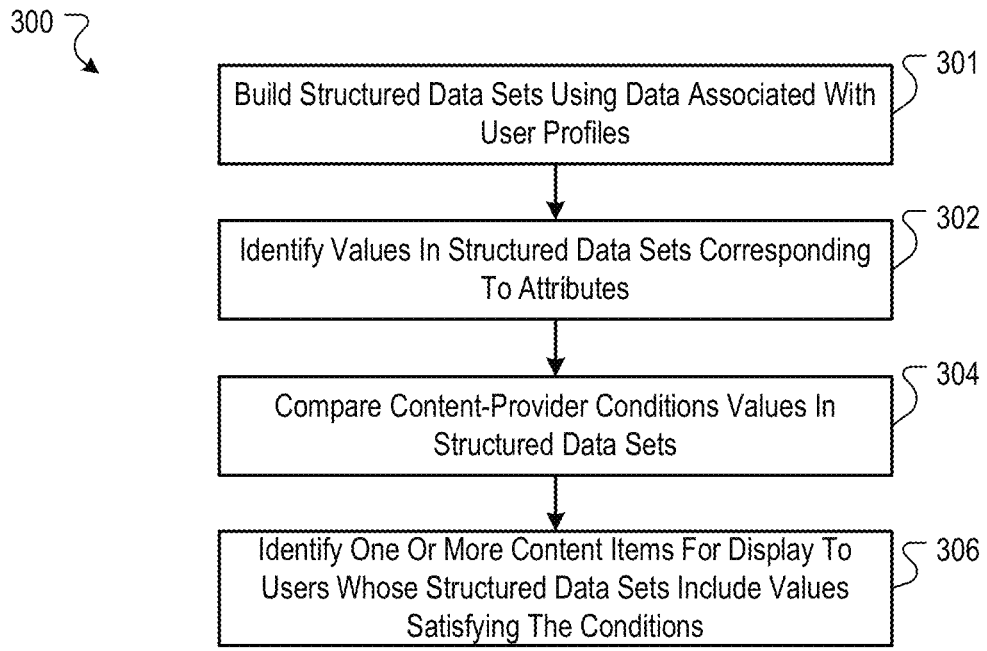
FIG. 3 is a flow diagram of an example process for identifying content items based on structured data sets.

FIG. 3 is a flow diagram of an example process 300 for identifying content items based on structured data sets. The process 300 can, for example, be implemented in the content targeting module 133. In some implementations, the content targeting module 133 may be within the content serving system 130. Other implementations, however, can also be used. For instance, the content targeting module 133 can be integrated into the social network system 110 or in a separate system in data communication with the social network system 110 and/or the content server system 130.

Stage 301 builds structured data sets using data associated with each user profile, including, for instance, user profile data 114*a*-114*n*, user media data 120*a*-120*n*, user acquaintances data 116*a*-116*n*, user groups data 118*a*-118*n*, and/or user options data 122*a*-122*n*. For example, the content targeting module 133 can identify and extract attribute and values from each of set of data.

Stage 302 identifies values in the structured data sets that correspond to attributes. For example, the content targeting module 133 can identify and extract attribute and values from each of set of data. The identified values are compared to content provider conditions in stage 304. For example, the content targeting module 133 can execute the comparison of values in structured data sets to the required values within conditions established by one or more content providers.

For instance, if a content provider conditions require: "Age: between 25 and 35", and "Zip code: 95051", then the content targeting module 133 can compare the values from the structured data sets that include the attributes "Age" and "Zip code" and determine whether the values satisfy the required values. The content targeting module 133 can store the results of the comparison such that users whose structured data sets satisfy the conditions may be targeted by content providers to receive content, e.g., an advertisement.

Stage 306 identifies one or more content items for display to users whose structured data sets include values satisfying the conditions. For example, the content serving system 130 can identify content items 132 that the content provider wishes to present to users.

Other processes for identifying content items based on structured data sets can also be used.

Figure 4:
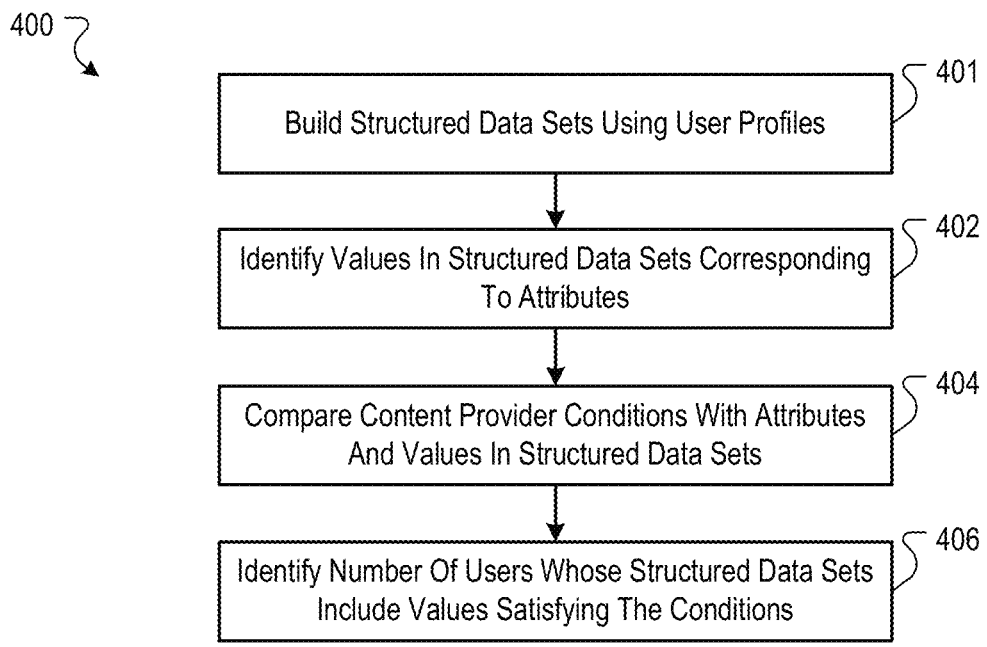
FIG. 4 is a flow diagram of an example process for identifying a number of users whose structured data sets satisfy conditions established by a content provider.

FIG. 4 is a flow diagram of an example process 400 for identifying a number of users whose structured data sets satisfy conditions established by a content provider.

The process 400 can, for example, be implemented in the content targeting module 133. In some implementations, the content targeting module 133 may be within the content serving system 130. Other implementations, however, can also be used. For instance, the content targeting module 133 can be integrated into the social network system 110 or in a separate system in data communication with the social network system 110 and/or the content server system 130.

Stage 401 builds structured data sets using data associated with each user profile, including, for instance, user profile data 114*a*-114*n*, user media data 120*a*-120*n*, user acquaintances data 116*a*-116*n*, user groups data 118*a*-118*n*, and/or user options data 122*a*-122*n*. For example, the content targeting module 133 can identify and extract attribute and values from each of set of data.

Stage 402 identifies values in the structured data sets that correspond to attributes. For example, the content targeting module 133 can identify and extract attribute and values from each of set of data. The identified values are compared to content provider conditions in stage 404. For example, the content targeting module 133 can execute the comparison of values in structured data sets to the required values within conditions established by one or more content providers. The content targeting module 133 can store the results of the comparison such that users whose structured data sets satisfy the conditions may be targeted by content providers to receive content, e.g., an advertisement.

Stage 406 identifies the number of users whose structured data sets include values satisfying the conditions. For example, the content serving system 130 can identify the number of users that may be served content items 132 under the content provider's current conditions. According to some implementations, this information may be provided to the content provider, which may use the information to determine whether the conditions should be revised to target a greater or lesser number of users.

Other processes for identifying a number of users satisfying content provider conditions can also be used.

Figure 5:
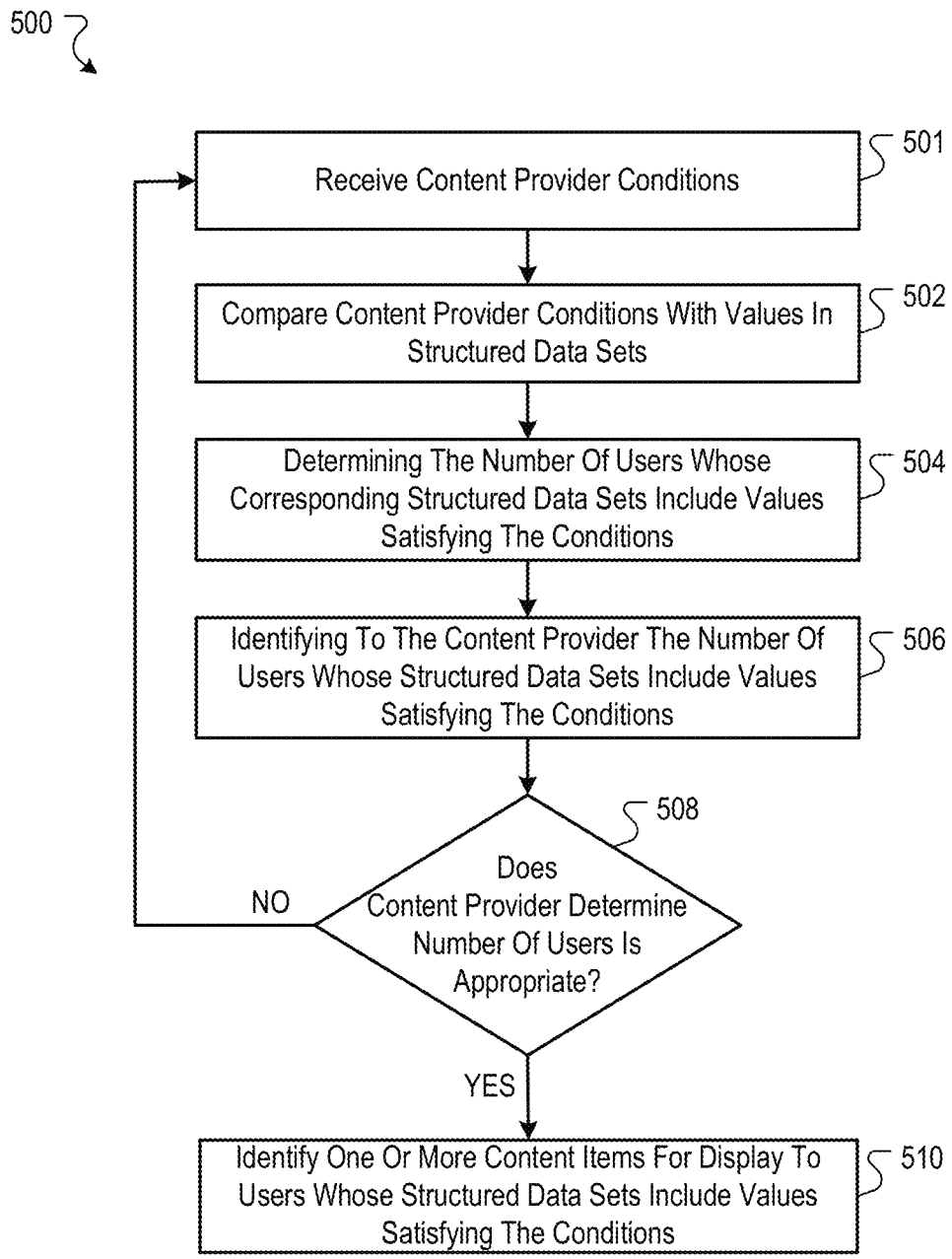
FIG. 5 is a flow diagram of an example process for iteratively permitting a content provider to modify the conditions that determine the users to which content items will be displayed.

FIG. 5 is a flow diagram of an example process 500 for iteratively permitting a content provider to modify the conditions that determine the users to which content items will be displayed.

The process 500 can, for example, be implemented in the content targeting module 133. In some implementations, the content targeting module 133 may be within the content serving system 130. Other implementations, however, can also be used. For instance, the content targeting module 133 can be integrated into the social network system 110 or in a separate system in data communication with the social network system 110 and/or the content server system 130.

Stage 501 receives content provider conditions. The conditions may be transmitted, for instance, from a content provider to the content serving system 130 or may be entered by a content provider using the content serving system 130 and/or content targeting module 133. For example, an advertiser may utilize a GUI at the content targeting module 133 to enter the conditions. This may be facilitated, for instance, using a series of pull down menus in which attributes may be selected, along with Boolean operators (e.g., 'and', 'or', etc.). Values may also be entered by content providers in a similar manner, such as manually or via pull down menus that provide content providers with the ability to select ranges, minimum values, maximum values, and the like.

Stage 502 compares the conditions received in Stage 501 with identified values in structured data sets corresponding to a group of users. For example, the content targeting module 133 can execute the comparison of values in structured data sets to the required values within conditions established by one or more content providers.

Stage 504 determines the number of users whose structured data sets include values satisfying the content provider conditions. This process may be implemented, for example, the content targeting module 133. This information is provided to the content provider in Stage 506 so that the content provider can use the information to determine whether the conditions should be revised to target a greater or lesser number of users.

In stage 508, if the content provider determines that the number of users is appropriate, in stage 510 the content targeting module 133 can identify one or more content items to be displayed to the users whose structured data sets include values satisfying the condition. Otherwise, the content provider can revise the conditions to target a greater or lesser number of users, and the process repeats starting at stage 501.

Other processes for iteratively permitting a content provider with information to determine whether conditions should be adjusted may also be used. For instance, instead of providing content providers with the total number of users that satisfy conditions, the content providers may be provided with metrics, such as the number of conversion or click-throughs that are anticipated by presenting content to a subset of users identified by the conditions.

Figure 6:
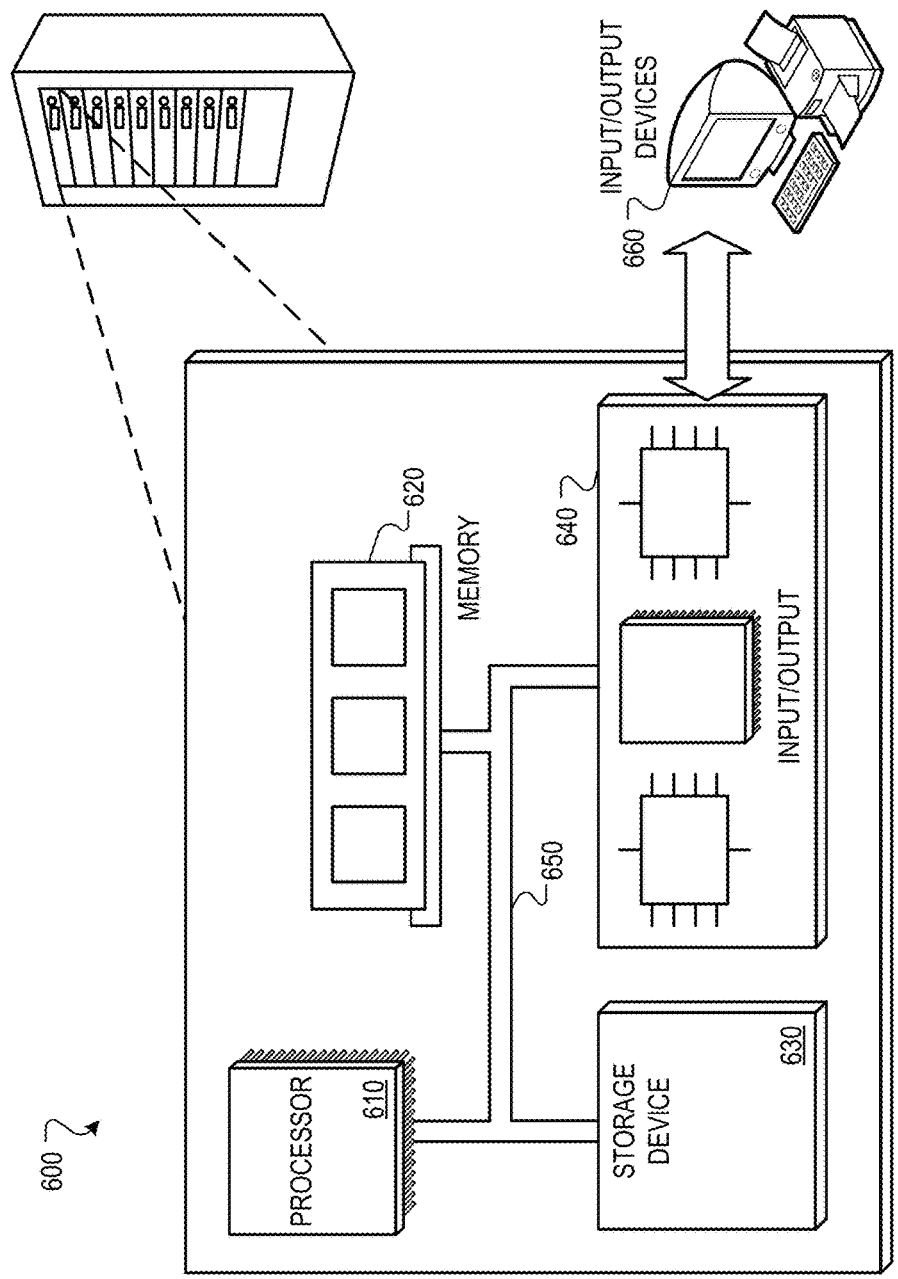
FIG. 6 is a block diagram of an example computer system that can be utilized to implement the systems and methods described herein.

FIG. 6 is a block diagram of an example computer system 600 that can be utilized to implement the systems and methods described herein. The system 600 includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method performed by one or more processing devices, comprising:
   identifying users, each user being associated with user profile data specifying one or more characteristics of the user;
   for each user,
     extracting, from the user profile data, the one or more characteristics of the user; and
     generating a structured data set representing the one or more characteristics of the user;
   for each of a plurality of structured data sets, tagging the structured data set with a tag specifying, for each of the one or more characteristics of that structured data set, whether that characteristic satisfies one or more conditions, with a condition specifying a particular characteristic of a structured data set;
   wherein each structured data set represents a different user associated with the user profile data;
   storing, in a data storage, the plurality of the structured data sets tagged with respective tags;
   following the tagging, receiving data specifying at least one of the one or more conditions as being a condition of a content provider;
   searching the respective tags of the plurality of structured data sets stored in the data storage to determine one or more structured data sets, of the plurality of structured data sets, that are each associated with a tag specifying a condition that corresponds to the condition of the content provider, the one or more structured data sets representing a first set of users;
   following determination of the one or more structured data sets representing the first set of users, identifying one or more content items for presentation to the first set of users;

determining a first expected performance of the one or more content items if the one or more content items are presented to the first set of users, the first expected performance being associated with a first period of time and being based on the first set of users and characteristics currently associated with the first set of users;

determining a second expected performance of the one or more content items if the one or more content items are presented to the first set of users, the second expected performance being associated with a second period of time, different from the first period of time, and being based on the first set of users and the characteristics currently associated with the first set of users; and presenting the first expected performance and the second expected performance to the content provider;

wherein a particular structured data set representing one or more particular characteristics of a particular user comprises one or more attribute-value pairs, and wherein a particular tag specifies whether one or more values of the one or more attribute-value pairs satisfies one or more conditions of that particular structured data set.

2. The method of claim 1, further comprising receiving a revised condition from the content provider.

3. The method of claim 2, further comprising comparing the revised condition to one or more tags.

4. The method of claim 3, further comprising determining a second set of the users having one or more updated characteristics that satisfy the revised condition.

5. The method of claim 1, further comprising displaying the one or more content items to the users in the first set of users after presenting the first expected performance and the second expected performance to the content provider.

6. The method of claim 5, further comprising identifying a click through rate associated with the one or more content items.

7. The method of claim 1, wherein a characteristic is selected from a group of characteristics comprising age, gender, number of friends, interests, zip code, and length of time since previous login.

8. The method of claim 1, further comprising receiving the condition from the content provider, where the condition identifies one or more required particular characteristics.

9. The method of claim 8, further comprising comparing the one or more required particular characteristics with one or more updated characteristics of one or more structured data sets.

10. The method of claim 1, wherein at least one characteristic is identified as public.

11. The method of claim 1, wherein at least one characteristic is identified as private.

12. The method of claim 11, further comprising determining to display the at least one characteristic identified as public to the content provider and determining not to display the at least one characteristic identified as private to the content provider.

13. The method of claim 1, wherein the first expected performance is for a first time of day and the second expected performance is for a second time of day different from the first time of day.

14. The method of claim 1, wherein the first expected performance is for a first day of a week and the second expected performance is for a second day of the week different from the first day of the week.

15. The method of claim 1, wherein determining a first expected performance and determining a second expected performance are performed in substantially real time.

16. The method of claim 1, wherein the first period of time preceded a current time and the second period of time is subsequent to the current time.

17. The method of claim 1, further comprising detecting a change of one or more characteristics for one or more of the plurality of structured data sets, and updating the tags for the respective one or more of the plurality of structured data sets.

18. The method of claim 1, wherein the first expected performance and the second expected performance are presented to the content provider for performing tasks comprising one or more of modifying the condition or modifying the one or more content items for presentation to the first set of users.

19. One or more non-transitory machine-readable storage devices storing instructions that are executable by one or more processing devices to perform operations comprising:
identifying users, each user being associated with user profile data specifying one or more characteristics of the user;
for each user,
extracting, from the user profile data, the one or more characteristics of the user; and
generating a structured data set representing the one or more characteristics of the user;
for each of a plurality of structured data sets, tagging the structured data set with a tag specifying, for each of the one or more characteristics of that structured data set, whether that characteristic satisfies one or more conditions, with a condition specifying a particular characteristic of a structured data set;
wherein each structured data set represents a different user associated with the user profile data;
storing, in a data storage, the plurality of the structured data sets tagged with respective tags;
following the tagging, receiving data specifying at least one of the one or more conditions as being a condition of a content provider;
searching the respective tags of the plurality of structured data sets stored in the data storage to determine one or more structured data sets, of the plurality of structured data sets, that are each associated with a tag specifying a condition that corresponds to the condition of the content provider, the one or more structured data sets representing a first set of users;
following determination of the one or more structured data sets representing the first set of users, identifying one or more content items for presentation to the first set of users;
determining a first expected performance of the one or more content items if the one or more content items are presented to the first set of users, the first expected performance being associated with a first period of time and being based on the first set of users and characteristics currently associated with the first set of users;
determining a second expected performance of the one or more content items if the one or more content items are presented to the first set of users, the second expected performance being associated with a second period of time, different from the first period of time, and being based on the first set of users and the characteristics currently associated with the first set of users; and
presenting the first expected performance and the second expected performance to the content provider;
wherein a particular structured data set representing one or more particular characteristics of a particular user comprises one or more attribute-value pairs, and wherein a particular tag specifies whether one or more values of the one or more attribute-value pairs satisfies one or more conditions of that particular structured data set.

20. The one or more non-transitory machine-readable storage devices of claim 19, the operations further comprising:

receiving a revised condition from the content provider.

21. The one or more non-transitory machine-readable storage devices of claim 20, the operations further comprising:

comparing the revised condition to one or more tags.

22. The one or more non-transitory machine-readable storage devices of claim 21, the operations further comprising:

determining a second set of the users having one or more updated characteristics that satisfy the revised condition.

23. The one or more non-transitory machine-readable storage devices of claim 19, the operations further comprising:

displaying the one or more content items to the users in the first set of users after presenting the first expected performance and the second expected performance to the content provider.

24. The one or more non-transitory machine-readable storage devices of claim 23, the operations further comprising:

identifying a click through rate associated with the one or more content items.

25. The one or more non-transitory machine-readable storage devices of claim 19, wherein the first expected performance is for a first time of day and the second expected performance is for a second time of day different from the first time of day.

26. The one or more non-transitory machine-readable storage devices of claim 19, wherein the first expected performance is for a first day of a week and the second expected performance is for a second day of the week different from the first day of the week.

* * * * *